(12) United States Patent
Montestruc

(10) Patent No.: US 8,216,108 B2  
(45) Date of Patent: Jul. 10, 2012

(54) GEAR ASSEMBLY WITH TAPERED FLEX PIN

(75) Inventor: Alfred Montestruc, Houston, TX (US)

(73) Assignee: Friede & Goldman, Ltd., Houston, TX (US)

( * ) Notice: Subject to any disclaimer, the term of this patent is extended or adjusted under 35 U.S.C. 154(b) by 699 days.

(21) Appl. No.: 12/322,781

(22) Filed: Feb. 5, 2009

(65) Prior Publication Data

US 2010/0197444 A1 Aug. 5, 2010

(51) Int. Cl.
 *F16H 57/08* (2006.01)
 *F16C 3/00* (2006.01)

(52) U.S. Cl. ......... 475/346; 475/331; 475/347; 464/179

(58) Field of Classification Search ............... 475/331, 475/346, 347; 464/179–181; 29/893.2
 See application file for complete search history.

(56) References Cited

U.S. PATENT DOCUMENTS

| | | | |
|---|---|---|---|
| 1,859,105 A | | 5/1932 | Munro |
| 2,749,778 A | * | 6/1956 | Kuhn .............................. 475/347 |
| 4,104,932 A | | 8/1978 | Hansson |
| 4,885,959 A | | 12/1989 | Shinjo et al. |
| 5,558,594 A | * | 9/1996 | Lefranc et al. ................. 475/347 |
| 5,787,766 A | | 8/1998 | Blach |
| 6,117,041 A | * | 9/2000 | Avery et al. .................... 475/347 |
| 6,994,651 B2 | | 2/2006 | Fox et al. |

\* cited by examiner

*Primary Examiner* — Tisha Lewis  
(74) *Attorney, Agent, or Firm* — Keaty Law Firm, LLC

(57) ABSTRACT

An epicyclic gear assembly has a central toothed sun gear unit mounted on a carrier plate and plurality of planetary gear sets surrounding the central gear in torque-transmitting relationship. Each of the planetary gear sets has a toothed planet gear supported by a planet shaft, the first end of which is cantilevered from the carrier plate. A second end of the planet shaft supports the planet gear. A double-tapered concave middle portion of the planet shaft allows flexing of the shaft so as to facilitate elastic deflection of the planet shaft while distributing load between the planet gear sets. The outer circumference of the middle portion has a pair of spaced outwardly convex protrusions formed between the first end and the second end.

25 Claims, 3 Drawing Sheets

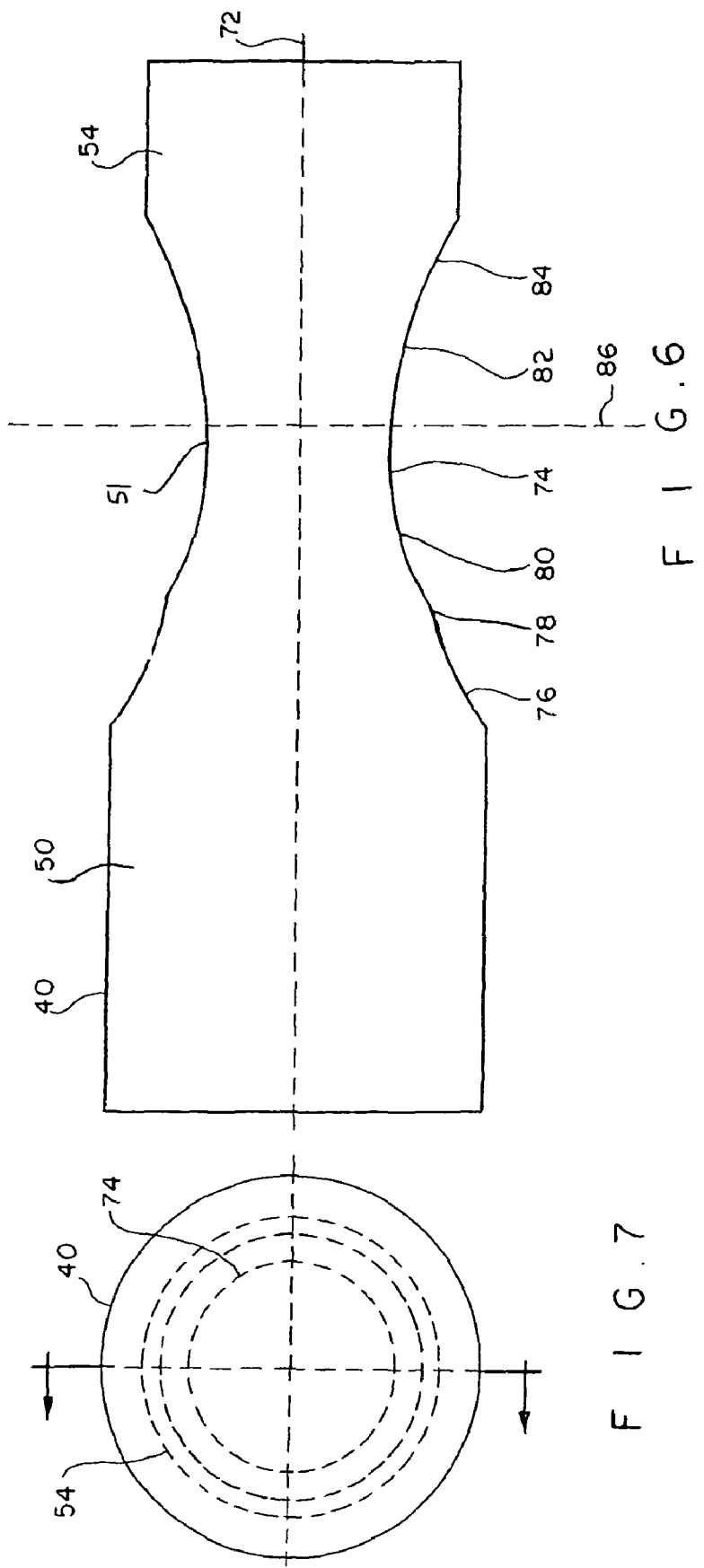

GEAR ASSEMBLY WITH TAPERED FLEX PIN

BACKGROUND OF THE INVENTION

This invention relates to gear assemblies, and more particularly to planetary gear sets that can be used in rack-and-pinion systems and other such industrial applications.

Planetary gear systems are widely used in a variety of industrial environments. In such arrangements, the rotational input is usually in the form of a sun gear. A plurality of planetary gears are mounted about the sun gear for receiving rotational force from the sun gear through intermeshing of respective teeth. Conventionally, planetary gears are mounted on a rotating planetary gear area, and the output element is usually in the form of a ring gear.

A typical epicyclic gear or planetary gear system in addition to sun gear and a plurality of planet gears uses a ring gear provided with internal teeth. The sun gear is located in the carrier, with the planet gear engaged to the sun and ring gear going around both the planetary gears and the sun gear. The ring gear is typically engaged with all the planet gears. Thus each planet gear is engaged with both the sun and the ring gear, and to none of the other planets, while the ring and sun are each engaged with all the planets. The planets are all mounted to the shafts in a parallel relationship, which relationship would ideally be retained during rotation. Of these three sets of items, sun, planets mounted on the carrier, and the ring gear, one will typically be held fixed and the other to rotate, with power to rotate fed to one rotating component, at a given angular speed and torque, and power taken from the other rotating component at a changed torque and speed related linearly or inversely to the first by the gear ratio.

A common problem in all gear systems both planetary and non-planetary is misalignment of the two gears as their teeth mesh. When the axes of rotation of the gears are not perfectly parallel the partial contacts of the teeth cause expanding and contact stresses to one end of a tooth. Theoretically, potential power loss of the gear assembly output due to misalignment can be 30 percent or higher. The out-of-parallel condition causes significant problems in excessive wear, added friction, added noise, and higher stress in the gear teeth, which causes metal fatigue.

Another issue created in planetary gear assemblies with four or more gears is the load distribution between the load gears. In order to better approximate uniform loading, one of the suggested methods is to allow plastic deformation of planet gear shafts and provide "flexible mounts." Still another problem arises due to deflection of the carrier under load, which will introduce the most misalignment when the gears are subject to maximum load. At such time the carrier torsional deformation introduces the largest misalignment due to the deformation. A significant part of the large percentage of derating of all gears due to misalignment is directly attributable to this fact.

One of the solutions offered by the industry is to use a pair of spaced-apart rigidly connected plates to function as the planet carrier. The double-pate design allows to significantly reduce deflection of the planet shaft and misalignment. However, the double-plate design is significantly heavier than the one plate, and more costly to construct. Such designs are not well suited to the use of flexible mountings for the planets, which in turn makes them poorly suited to use of more than three planets. Also out-of-tolerance issues will tend to be aggravated by the stiffness of those designs Another approach to the problem is shown in U.S. Pat. No. 3,303,713 issued to R. J. Hicks in 1967. According to the '713 patent, a sleeve is interposed between the gear and the shaft, upon which the gear wheel is located. The shaft has opposite end portions rigidly secured between the gear wheel and the carrier. The space between the gear wheel and the carrier is said to allow the shaft to flex to provide uniform loading. Hicks also teaches the shaping of the pin such that it is flattened on the two sides parallel to the radial axis of the sun and perpendicular to the tangential direction of the planet motion. The object of this design is to reduce the section modulus on that axis to allow larger deflections in that direction which better allows for load sharing, and also allows for better prevention of deflection in the radial direction due to centripetal forces.

Still another attempt to solve the above-stated problems is shown in U.S. Pat. No. 6,994,651 issued to G. P. Fox and E. Jallat, where an epicyclic gear system that has a sun gear, a ring gear located around the sun gear and planet gears located between and engaged with the sun and ring gears is disclosed. A carrier flange is offset axially from the planet gear and a carrier pin projects from it into the planet gear. Each carrier pin, being cantilevered from the carrier flange, has a double taper and is said to deflect relative to the flange under the torque. The inner race, being cantilevered from the pin at its opposite end where the deflection of the pin is the greatest, deflects in the opposite direction so as to compensate for the deflection caused by the pin. As a consequence of the two deflections, the axis Y for the planet gear remains essentially parallel to the center axis X, and the planet gear remains properly meshed with the sun gear and ring gear. A groove in the pin is said to facilitate the flexure of the pin.

While the systems of the '713 and '651 patents may work satisfactorily in certain environments, there exists a need for a gear assembly for use in high-load environment, rack and pinion systems of a jack-up.

SUMMARY OF THE INVENTION

It is, therefore, an object of the present invention to maximize the deflection of the planet gears load to aid in load sharing between planet gears.

It is another object of the invention to minimize the misalignment with respect to the sun gears.

These and other objects of the invention are achieved through a provision of an epicyclic gear assembly that has a central toothed sun gear unit mounted on a carrier plate and plurality of planetary gear sets surrounding the central sun gear in torque-transmitting relationship. Each of said planetary gear sets has a toothed planet gear supported by a planet shaft, the first end of which is cantilevered from the carrier plate. A second end of the planet shaft supports the planet gear. A double-tapered concave middle portion of the planet shaft allows flexing of the shaft so as to facilitate elastic deflection of the planet shaft while distributing loads between the planet gear sets. The outer circumference of the middle portion has a pair of spaced outwardly convex protrusions formed between the first end and the second end.

BRIEF DESCRIPTION OF THE DRAWINGS

Reference will now be made to the drawings, wherein like parts are designated by like numerals, wherein

FIG. 6 is a longitudinal sectional view showing the planetary gear shaft.

FIG. 7 is a cross sectional view of the planetary gear shaft.

DETAIL DESCRIPTION OF THE INVENTION

Figure 2:
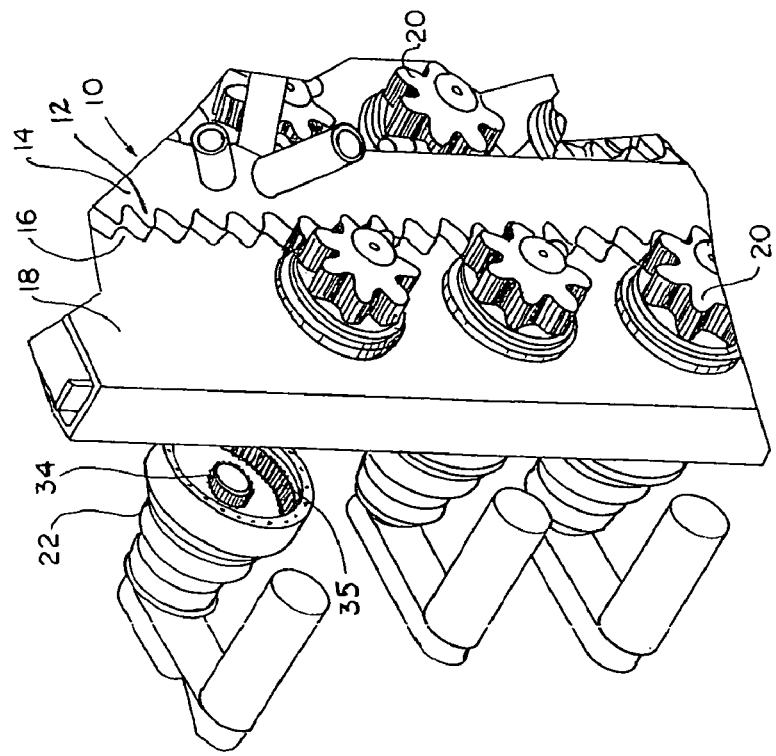
FIG. 2 is a perspective view of a jack-up rig leg chord, with a planetary gearbox moved back to show the sun gear.

As discussed above, on any sort of planetary gearbox application, one significant issue is load sharing among the planets. Many effects can cause misdistribution of loads between planet gears. These would include, but are not limited to tolerance errors in the manufacture of components of the gearbox, side loads introduced to the carrier in the case of a jacking system, storm loads causing deflections of the jacking pinion shaft, the rig leg chord walking off center of the jack case if the leg guides are worn excessively, a wind turbine seeing eccentric loads on the rotor due to the wind speed being higher above the centerline of the rotor than below. Any of these sorts of issues can cause some planet gear meshes to see significantly higher loads that the others, and to deal with this, a softer (more deflection per unit load) flex pin help by allowing the more loaded planet to deflect more and so push the load via the carrier to other planets is desirable. The present invention solves these problems through the structural aspects of the gear box assembly described below.

Turning now to the drawings in more detail, numeral 10 designates a jack-up leg chord that conventionally has a row of teeth 12 extending along opposing vertical sides 14. The legs of a jack-up rig (not shown) are typically elevated above the water surface during transportation of a rig to a deployment site, and are then lowered to rest on a sea bottom. The hull of the rig is then elevated using a rack-and-pinion system to a height above an anticipated wave action. As the hull is elevated, the teeth 12 of the leg chord 10 engage with the teeth 16 of a jack case 18.

Conventionally, jacking pinions 20 transmit torque to the leg chords 10, causing the legs to move vertically in relation to the rig hull. A motor positioned on a rig transmits rotation to each pinion 20 through a gear assembly 30, which is secured to the jack case 18 opposite the pinions 20. The gear assembly 30 is secured in a gear box 22, with the central pinion, or sun gear 34 being connected to a motor. An outer ring gear 35 is mounted in the gear box 22.

It is assumed that the planetary gearbox arrangement offers many advantages over traditional gearbox arrangements. One advantage is its unique combination of both compactness and outstanding power transmission efficiencies. Typical efficiency losses in a planetary gearbox arrangement is only 3% per stage. This type of efficiency ensures that a high proportion of the energy being input through the sun gear into the gearbox is multiplied and transmitted into torque, rather than being wasted on mechanical losses inside the gearbox. Another advantage of the planetary gearbox arrangement is load distribution. Because the load being transmitted is shared between multiple planets, or planetary gear sets 36 torque capability is greatly increased. The more planets in the system the greater load ability and the higher the torque density. The planetary gearbox arrangement also creates greater stability and increased rotational stiffness. However, as stated above, such engineering solutions are not without problems, such as the design complexity and gaps between the meshing teeth during rotation of the sun gear 34.

As can be seen in the drawings, the planetary gear sets 36 are mounted on a carrier plate 38 through planetary gear shafts 40. Each planetary gear set has a toothed planet gear which is designed to mesh with the teeth of the sun gear 34 and the ring gear 35. Each planet shaft 40 is fixedly connected to the carrier plate 38 at 90-degree angle to the flat surface of the carrier 38. The planet gears 36 transmit torque from the sun gear 34 to the carrier 38. The planet shafts or flex pins 40 are secured in parallel relationship to each other, with central axes of the planet gears 40 being parallel to the central axis of the sun gear 34.

Each planetary gear 36 is provided with teeth that have complimentary contact surfaces for engaging the centrally-located sun gear 34. Conventionally, the gear assemblies may contain four or more planetary gears surrounding the sun gear 34. Rotation of the motor shaft and the sun gear 34 causes rotation of the planet gears 36, and engagement of the rotating planet gear 36 about the individually secured shafts 40 causes the planet gears 36 to revolve around the sun gear 34 and rotation of the carrier 38.

Figure 1:
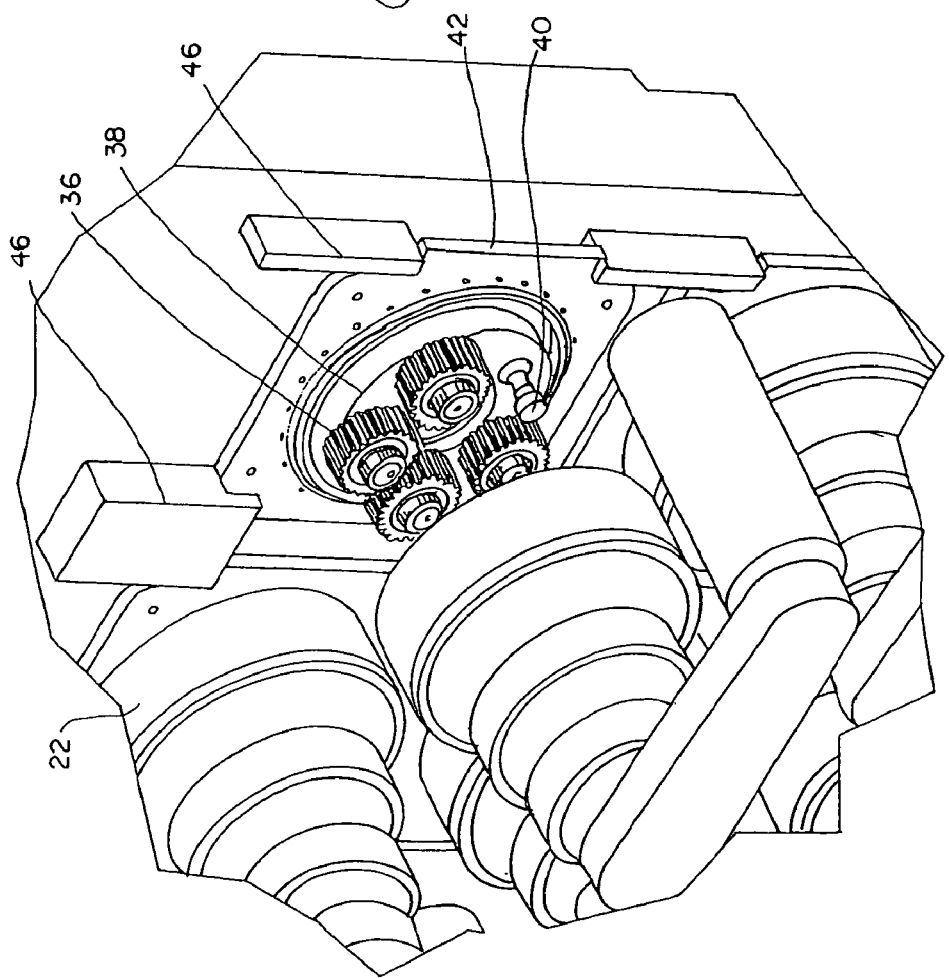
FIG. 1 is a perspective view of the gear assembly in accordance with the present invention, with one of the planetary gears removed for clarity.
Figure 5:
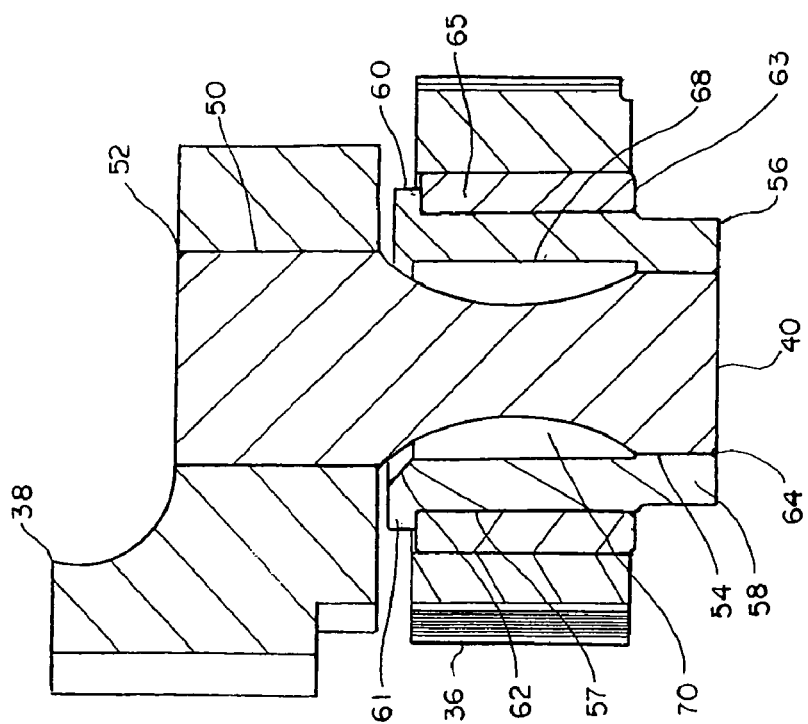
FIG. 5 is a cross sectional view of one of the planetary gears.
Figure 4:
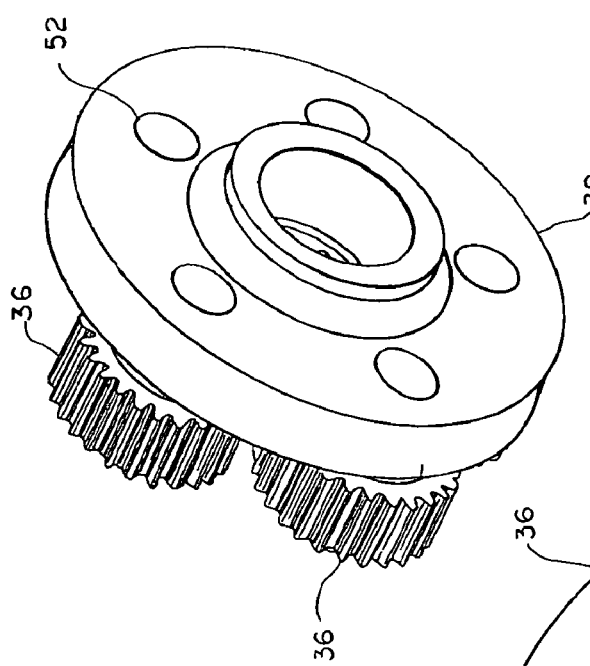
FIG. 4 is a perspective view of the gear box shown in FIG. 4 illustrating the carrier plate and also illustrating groove welds between the carrier and the planetary gear shafts.
Figure 3:
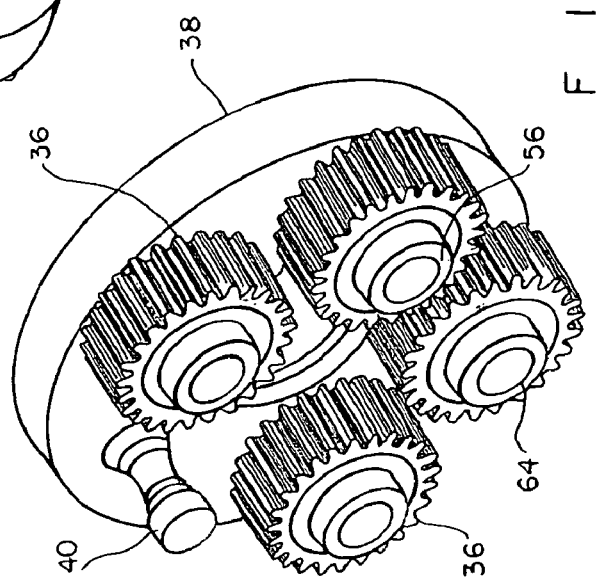
FIG. 3 is a perspective view of the gear box according to the present invention with one of the toothed gears removed to show the gear shaft, or flex pin.

As can be seen in FIG. 1, the carrier plate 38 is secured to a torque plate 42, which abuts the jack case 18. In the embodiment shown in the drawings, the torque plate 42 is held in place by a plurality of torque lugs 46 carried by the jack case 18.

The planet carrier 38 is press-fitted to a first end 50 of the flex pin 40. The flex pin 40 is cantilevered from the carrier plate 38 at its first end 50. The longitudinal dimensions of the first end 50 are substantially equal to the thickness of the carrier plate 38. A weld 52 is formed along adjoining grooves formed in the carrier plate 38 and the first end 50 of the flex pin 40.

A second end 54 of the flex pin 40 is press fitted with a planet sleeve, or sleeve 56, which surrounds the end 54 about its entire circumference. The end 54 has a generally smaller diameter than the first end 50 and is smaller in longitudinal dimension than the first end 50.

The sleeve 56 comprises a tubular body having a distant end 58 engaging the second end 54 of the flex pin 40, and a proximate end 60 that is located adjacent to the first end 50 of the flex pin 40 without touching the flex pin 40. A chamfer cut 62 is made at the second end 60 to allow longer useful bending length of the flex pin 40, as will be described in more detail hereinafter.

A weld 64 is made between the distant end 58 of the sleeve 56 and the second end 54 of the flex pin 40. The weld 64 is formed in the adjoining grooves formed in the edge surfaces of the sleeve 56 and the flex pin 40.

The sleeve 56 has an outer cylindrical surface 57, which provides a contact surface for the planet gear 36. An outwardly extending flange 61 is formed about the proximate end 60 of the sleeve 56. A planet bearing 63 is interposed between the outer surface 57 and the planet gear 36. One end 65 of the planet bearing 63 abuts against the inner face of the flange 61. The planet bearing 63 has longitudinal dimensions substantially equal to the longitudinal dimensions of the planet gear 36.

The middle portion 51 of the flex pin 40 is formed between the first end 50 and second end 56 of the flex pin 40. The middle portion 51 has a reduced diameter having generally double-tapered configuration. An annular space 70 is defined between an inner surface 68 of the sleeve 56 and the outer surface of the middle portion 51. As can be seen in the drawings, the construction of the flex pin 40 provides for the second end 56 to have smaller longitudinal dimensions that those of the first end 50.

Each flex pin 40 has a central longitudinal axis 72, and the middle portion 51 has a smallest diameter portion 74. The middle portion 51 generally tapers toward the smallest diameter portion 74, as shown in detail in FIG. 6. The tapering of the outside surface of the flex pin middle portion 51 is not uniform. A first concave part 76 is formed adjacent the first end 50 of the flex pin 40. An outwardly convex second part or protrusion 78 extends unitary from the first concave part 76.

A third concave part 80 extends unitary from the second convex part 78. The first concave part 76 has a generally smaller radius of curvature than the third concave part 80. The third concave part 80 covers the smallest diameter portion 74, after which the outer surface of the middle portion 51 gradually increases in diameter toward the second end 54 of the flex pin 40. A fourth outwardly convex part 82 defines a second outwardly convex protrusion, which extends unitary from the third concave part 80. A fifth concave part 84 forms an arcuate surface adjacent the second end 54 of the flex pin 40.

An imaginary line 86 passes through the third concave part 80. The line 86 represents an expected line of force applied by the planet gear 36 onto the planet sleeve 56. The force which would normally bend the flex pin 40, causes flexing of the pin 40 due to the double-tapered design of the middle portion and the presence of concave/convex parts. The force is then transmitted by press fit to the entire length of the double-taper flex pin 40. The concave radii of the parts 76 and 82 cut into the pin surface may be constant infinite (flat) or variable (typically an elliptical function). The convex radii of the parts 78 and 82 cut into the flex pin surface may be constant infinite (flat) or variable (typically an elliptical function).

The outwardly convex circumferential protrusions defined by the convex parts 78 and 82 need not be equally spaced from each other in relation to the center of the middle portion 51. On each circumferential side of the protrusions 78, 82, concave surfaces are defined to provide the applied force distribution so that the flex pin 40 flexes in the axial direction of the axis 72. It is envisioned that in some applications at least one circumferential outwardly convex protrusion may be used.

The gear assembly of the present invention allows to substantially increase deflection at the same or lower stress for an identical load and to improve load sharing among planet gears.

The softness of the double tapered flex pin as a spring will allow small misalignments to correct themselves as force introduced by the misalignment on the gear tooth can be seen as a generally small additional moment added or subtracted to the moment and shear load applied to the flex pin. A flex pin of this invention tends to deflect in a way that minimizes the eccentric loading due to misalignment, and the softer (more deflection per given load) the flex pin, the less the misalignment will matter in the operation of the gear assembly of this invention.

Asymmetric placement of the shaft end supports facilitates a controlled deflection of the shaft such that this deflection of the planet shaft closely matches the deflection of the planet carrier, but in the exact opposite direction so that the planet gear alignment stays coaxial with the carrier rotation.

The structure of the instant gear assembly provides for asymmetric stiffness of the shaft 40 on opposite sides of the applied load, this is facilitated by different slopes of taper on two opposite sides of the point of load application. In the structure of the instant flex pin, the places of highest bending moment have the highest diameter while places of lower bending moment have smaller diameter, which tends to increase the deflection of the shaft while not raising the stress in the shaft.

The planet shafts may be made from carburized steel (or other hardened steel) to allow much smaller diameter to be used for higher spring deflection. In one of the aspects of the invention, the planet bearing 63 is made of soft metal, as a result of which the soft insert is placed between the very hard steel carburized shaft and hard steel hubs. The planet bearing inserts should be made of a material with a much lower modulus of elasticity than steel as these will hold the shaft with a light press fit. This aspect allows to avoid frettage cracking of the shaft, which might result in a short number of cycles if the hubs (carrier plate and sleeve) were directly press fit onto the shaft.

The instant invention allows as much elastic deflection of the planet under load as possible to distribute load between the planets. Additionally, the alignment of the planet gear with respect to the sun and ring gears is maintained due to the flexing abilities of the planet shafts.

Many changes and modifications can be made in the present invention without departing from the spirit thereof. I, therefore, pray that my rights to the present invention be limited only by the scope of the appended claims.

I claim:

1. A gear assembly comprising a central gear mounted on a carrier plate and plurality of planetary gear sets surrounding the central gear in torque-transmitting relationship, wherein each of said planetary gear sets comprises a planet gear supported by a planet shaft, the planet shaft comprising a first end cantilevered from the carrier plate, a second end supporting the planet gear, and a concave middle portion of reduced diameter, and wherein said middle portion has an outer circumference provided with at least one outwardly convex circumferential protrusion formed between the first end and the second end.

2. The apparatus of claim 1, wherein said middle portion is provided with a pair of spaced-apart outwardly convex circumferential protrusions.

3. The apparatus of claim 1, wherein said middle portion comprises a first concave part adjacent the first end of the planet, a second outwardly convex circumferential part, a third concave part substantially covering a centerline of the middle portion, a fourth outwardly convex circumferential part adjacent the third concave part, and a fifth concave part formed adjacent the second end of the planet shaft.

4. The apparatus of claim 1, wherein the planet shaft has an asymmetric aspect, wherein the second end of the planet shaft has smaller radial dimensions than the first end of the planet shaft.

5. The apparatus of claim 1, wherein the planet shaft has an asymmetric aspect, wherein the second end of the planet shaft has smaller longitudinal dimensions than the first end of the planet shaft.

6. The apparatus of claim 1, wherein the second end of the planet shaft is secured to a planet sleeve, said sleeve surrounding the second end and the middle portion of the planet shaft.

7. The apparatus of claim 6, wherein the second end of the planet shaft is welded to the planet sleeve.

8. The apparatus of claim 6, wherein an annular space is defined between an inner surface of the planet sleeve and an outer circumference of the middle portion.

9. The apparatus of claim 6, wherein each of said planet gear sets further comprises a planet bearing interposed between the planet sleeve and the planet gear.

10. The apparatus of claim 6, wherein said planet sleeve has a proximate end adjacent the first end of the planet shaft and a distant end adjacent the second end of the planet shaft.

11. The apparatus of claim 10, wherein the proximate end of the planet sleeve carries an outwardly extending flange, and wherein the planet bearing abuts the flange, fitting between the planet gear and the planet sleeve.

12. The apparatus of claim 10, wherein the proximate end of the planet sleeve is provided with a chamfer cut extending from an inner surface of the planet sleeve.

13. The apparatus of claim 1, wherein the first end of the planet shaft is welded to the carrier plate.

14. The apparatus of claim 1, wherein the middle portion tapers down in a concave aspect from the first end of the planet shaft and from the second end of the planet shaft.

15. The apparatus of claim 1, wherein the middle portion has a double-taper aspect, with opposite ends of the middle portion tapering down from the first end and the second end of the planet shaft.

16. A gear assembly comprising a central toothed sun gear unit mounted on a carrier plate and plurality of planetary gear sets surrounding the central gear in torque-transmitting relationship, each of said planetary gear sets comprising a toothed planet gear supported by a planet shaft, the planet shaft comprising a first end cantilevered from the carrier plate, a second end supporting the planet gear, and a double-tapered concave middle portion of reduced diameter, and wherein said middle portion has an outer circumference provided with at least one outwardly convex circumferential protrusion formed between the first end and the second end, said middle portion facilitating flexing of the planet shaft so as to allow elastic deflection of the planet shaft while distributing load between the planet gear sets.

17. The apparatus of claim 16, wherein each of the said planet shafts is retained in a generally parallel relationship to a central axis of the central sun gear during torque transmission between the sun gear and the planet gear sets.

18. The apparatus of claim 16, wherein said middle portion comprises a first concave part adjacent the first end of the planet, a second outwardly convex circumferential part, a third concave part substantially covering a centerline of the middle portion, a fourth outwardly convex circumferential part adjacent the third concave part, and a fifth concave part formed adjacent the second end of the planet shaft.

19. The apparatus of claim 16, wherein the planet shaft has an asymmetric aspect, wherein the second end of the planet shaft has smaller radial and longitudinal dimensions than the first end of the planet shaft.

20. The apparatus of claim 16, wherein the second end of the planet shaft is fixedly secured to a planet sleeve, said sleeve surrounding the second end and the middle portion of the planet shaft.

21. The apparatus of claim 20, wherein an annular space is defined between an inner surface of the planet sleeve and an outer circumference of the middle portion.

22. The apparatus of claim 20, wherein each of said planet gear units further comprises a planet bearing interposed between the planet sleeve and the planet gear.

23. The apparatus of claim 20, wherein said planet sleeve has a proximate end adjacent the first end of the planet shaft and a distant end adjacent the second end of the planet shaft.

24. The apparatus of claim 23, wherein the proximate end of the planet sleeve carries an outwardly extending flange, and wherein the planet bearing abuts the flange, fitting between the planet gear and the planet sleeve.

25. The apparatus of claim 23, wherein the proximate end of the planet sleeve is provided with a chamfer cut extending from an inner surface of the planet sleeve.

* * * * *